June 9, 1925.
L. G. FINNICUM
TIRE RIM FOR AUTOMOBILE WHEELS
Filed Nov. 15, 1924
1,541,131
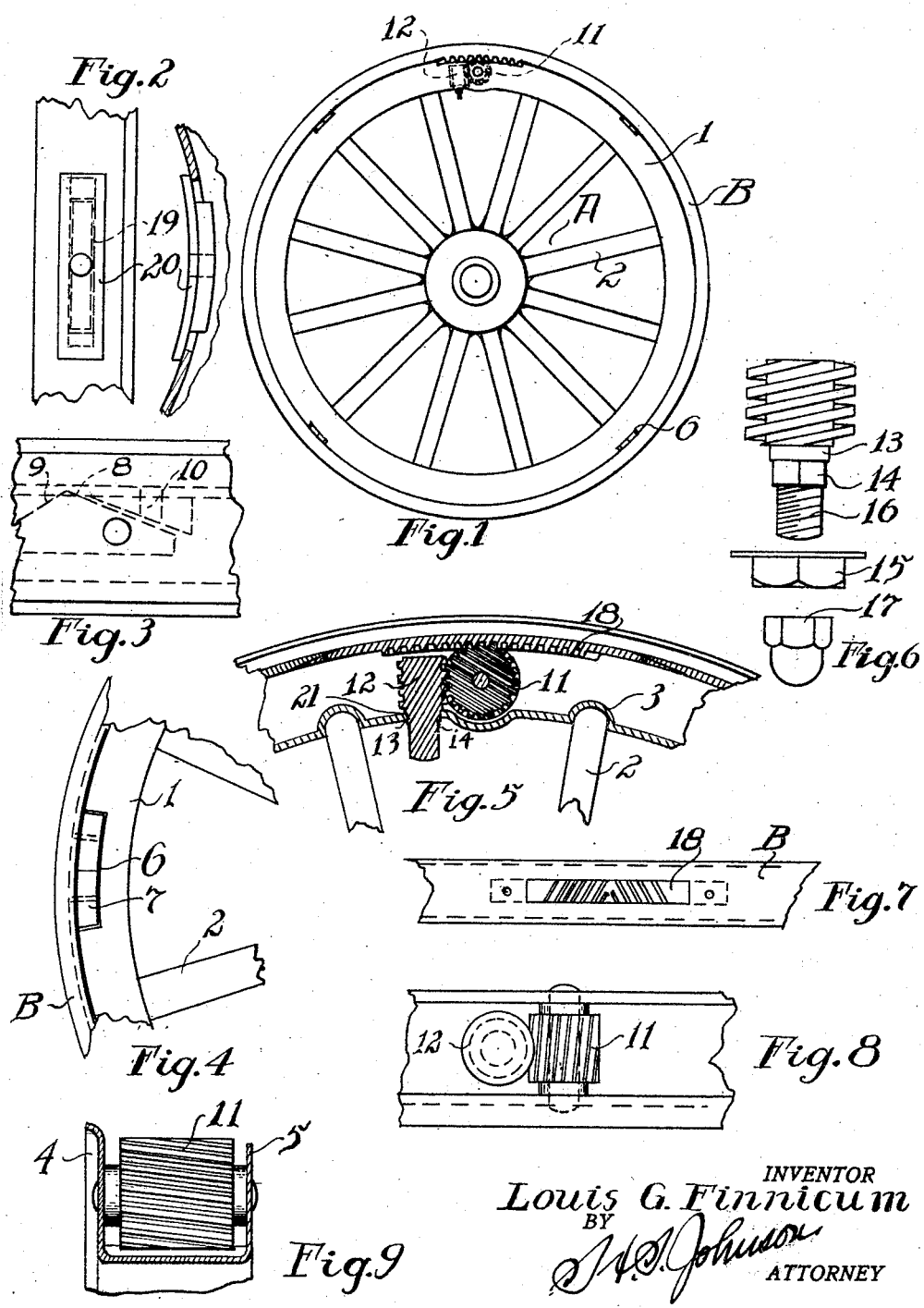

Patented June 9, 1925.

1,541,131

UNITED STATES PATENT OFFICE.

LOUIS G. FINNICUM, OF ST. PAUL, MINNESOTA.

TIRE RIM FOR AUTOMOBILE WHEELS.

Application filed November 15, 1924. Serial No. 750,106.

*To all whom it may concern:*

Be it known that I, LOUIS G. FINNICUM, a citizen of the United States, residing at St. Paul, in the county of Ramsey and State of Minnesota, have invented certain new and useful Improvements in Tire Rims for Automobile Wheels, of which the following is a specification.

The present invention relates to a demountable rim for automobile wheels.

An object of the present invention is to improve and simplify a demountable rim for automobile wheels.

Another object of the invention is to rotate a rim for automobile wheels a predetermined distance with respect to a wheel to lock the rim on the wheel.

Another object is to affix a demountable rim on an automobile wheel by the actuation of a rotative element.

In order to attain these objects there is provided, in accordance with one feature of the invention, an automobile wheel having gear means rotatably connected thereto, a plurality of notches in the felly of said wheel, cam means adjacent said notches, and a removable tire carrying rim having teeth therein to engage the gear element and having cams to enter the notches in the edges of said wheel, to lock the rim on the wheel.

These and other features of the invention, not specifically mentioned, will be more fully brought out in the following description and the accompanying drawings, wherein:

Figure 1, is a view in side elevation of an automobile wheel made in accordance with the present invention having a demountable rim in position thereon, but not drawn to a locked condition.

Figure 2, is a view in plan and longitudinal section, respectively, of a closure for a valve receiving slot in the felly of the wheel.

Figure 3, is a plan view of a portion of a rim mounted on a wheel, a pair of interlocking cams and the felly of the wheel being shown in dotted lines.

Figure 4, is a view in side elevation of a portion of a wheel with a demountable rim in position thereon, a cam carried by the rim being shown as inserted in a notch in the felly of the wheel but not drawn to a locked position.

Figure 5, is a sectional view of a portion of a wheel, with a tire carrying rim in position thereon, a gear carried by the wheel being shown in operative engagement with a rack formed on the interior surface of the rim.

Figure 6, is a view in side elevation of a worm gear and associated parts, disassembled to show the structure thereof.

Figure 7, is a plan view of a rack affixed to the interior of a tire carrying rim.

Figure 8, is a plan view of a portion of the felly of a wheel showing a worm gear and pinion mounted therein; and Figure 9, is a view in cross section of the felly of a wheel showing the method of mounting the spur gear therein.

Referring to the drawings in detail, an automobile wheel A may be of a well known type comprising a felly 1 of pressed metal of substantially U-shaped cross section, spokes 2 being held in indentations 3 in the interior of said felly. The side 4 of the felly, which is designed to be the one nearest the body of the automobile with which it is associated, is somewhat higher than outer side 5 in accordance with a well known principle of automobile wheel construction. In the outer side 5 of the felly are cut a plurality of notches 6 of a size to freely admit lugs 7 affixed to the interior face of a tire carrying rim B. Each lug 7 is provided with a pair of angularly disposed faces 8 and 9 (see Figure 3) which are designed to lie at an angle of about 15 degrees to the plane of the rim. Laterally adjacent each of the notches 6 in the felly, a cam 10 is affixed to the outer side wall of the felly. For right hand wheels the cams 10 are preferably affixed to the left or counter-clockwise side of each notch 6 when looking at the outward face of the wheel; and, conversely, the cams for a left hand wheel would be positioned at the right or clockwise side of each notch 6 when looking at the wheel in the same manner.

A spur gear 11 is rotatably mounted intermediate the side walls of the felly, and is in operative association with a worm gear 12 of the type shown in Figure 6 mounted to rotate in an opening 21 in the bottom of the felly. The teeth of the spur gear 11 are necessarily cut at an angle to coact with the worm gear 12. A shoulder 13 on the worm gear 12 is of circular cross section and is designed to fit into the opening 21 in the bottom of the felly. A second shoulder 14 of square cross section is also provided to receive a nut 15 having a square opening centrally thereof to slidably fit over the shoulder 14. An extension 16 is threaded as shown to receive a cap 17 which is threaded interiorly to screw onto the threaded portion 16 to draw the nut 15 into close engagement with the felly to lock the worm gear against rotation when the rim B is in position thereon.

The rim B may be of a type ordinarily employed to carry automobile tires and commonly designated a "demountable rim". Set into the rim in the manner indicated in Figure 5 is a rack 18 having angularly disposed teeth of a shape to engage the teeth of the spur gear 11. Inasmuch as the teeth of the spur gear are disposed at an angle to the axis of rotation thereof, it is necessary that the teeth of the rack 18 be likewise angularly disposed to engage said teeth. A plan of a rack is shown in Figure 7. The rim B is intended to be initially placed on a wheel so that the spur gear 11 is substantially at the center of the rack 18. If it is placed on a right hand wheel of an automobile the spur gear will travel over the right hand teeth of the rack to draw the rim into a locked condition, and, if it is on a left hand wheel, the spur gear will travel over the left hand teeth of the rack to accomplish this purpose.

In Figure 2 is shown a portion of the felly of a wheel, a longitudinal slot 19 being provided to permit the movement therein of a valve stem (not shown) of a type commonly employed upon automobile tires and a cover member 20 therefor which is intended to be slipped over the valve stem to seat in the slot 19 and prevent the entrance therein of foreign matter when the wheel is in operation.

What I claim is:

1. In a wheel having a demountable rim, a channeled felly, a plurality of notches in a wall of said felly, cam means connected interiorly of the felly adjacent said notches, gear means mounted interiorly of the felly and rotatable from without the felly, locking means associated with the gear means to lock the gear means against rotation, cam means integral with the demountable rim to register with the notches in the felly, and a rack mounted interiorly of the demountable rim to engage the gear means to move the rim relatively with respect to the felly to draw the faces of the cam means on the rim into engagement with the cam means on the felly to lock the rim on the wheel.

2. In a wheel, a channeled felly, notches in the outer wall thereof, cam means adjacent each notch in a reverse direction from that of rotation, primary gear means mounted intermediate the felly walls, secondary gear means coacting therewith, means to manually rotate the secondary gear means to advance the primary gear means, locking means threadedly connected to the secondary gear means to lock the secondary gear means to the felly to thereby prevent rotation of the primary gear means, a demountable rim to slidably fit the felly, cam means interiorly thereof having a face thereon lying at an angle to the plane of the rim; and a rack carried interiorly of the rim to engage the primary gear means to move the rim relatively with respect to the felly to lock the rim on the felly.

In testimony whereof I affix my signature.

LOUIS G. FINNICUM.